United States Patent [19]

Peplinski

[11] Patent Number: 5,564,350

[45] Date of Patent: Oct. 15, 1996

[54] METHOD AND APPARATUS FOR REMOVAL OF RESIDUAL PRODUCT

[76] Inventor: Mark E. Peplinski, A4704 52nd St., Holland, Mich. 49423

[21] Appl. No.: 188,634

[22] Filed: Jan. 27, 1994

[51] Int. Cl.$^6$ .................................. F23J 3/00; F23G 5/00
[52] U.S. Cl. ..................... 110/344; 110/348; 110/259; 110/170; 210/409
[58] Field of Search ................................. 110/257, 259, 110/344, 165 R, 170, 348; 34/179, 181, 241; 210/409, 413, 414, 415

[56] References Cited

U.S. PATENT DOCUMENTS

| | | | |
|---|---|---|---|
| 1,139,825 | 5/1915 | Vandercook | 210/409 X |
| 2,404,215 | 7/1946 | Cavanugi | 210/415 X |
| 4,431,541 | 2/1984 | Lee | 210/415 X |
| 4,846,082 | 7/1989 | Marangoni | 110/170 X |
| 5,259,955 | 11/1993 | Bolton | 210/409 X |

OTHER PUBLICATIONS

Rosenmund Filter—Side Discharge, Author: Rosenmund, Publication date: prior to Jan. 27, 1994.
Rosenmund—Pharma Filter—Pharma Filter–Dryer, Author: Rosenmund, Publication date: prior to Jan. 27, 1994.
Pilot and Small Scale Filter and Filter–Dryer, Author: Rosenmund, Publication date: prior to Jan. 27, 1994.

Primary Examiner—Henry A. Bennett
Assistant Examiner—Susanne C. Tinker
Attorney, Agent, or Firm—Varnum, Riddering, Schmidt & Howlett LLP

[57] ABSTRACT

A filter-dryer unit has an agitator having an agitator arm provided with gas discharge nozzles directed at the bottom wall, which includes a liquid discharge filter element, of the vessel of the filter-dryer unit. High pressure, high velocity gas is discharged through the nozzles to break up and remove the heel, consisting of finished product not expelled by agitator action. Product particles from the heel, after the heel has been broken up, are removed by agitator action and by the pressure of the gas discharged through the nozzles, through a standard product discharge opening. A separator/filter unit is provided to separate particles from the gas being discharged through the vessels discharge opening. The agitator arm is provided with a nozzle directed at the side wall of the vessel to remove any residual product on the side wall and a nozzle directed at an angle to the side wall to facilitate removal of the heel adjacent the side wall.

13 Claims, 1 Drawing Sheet

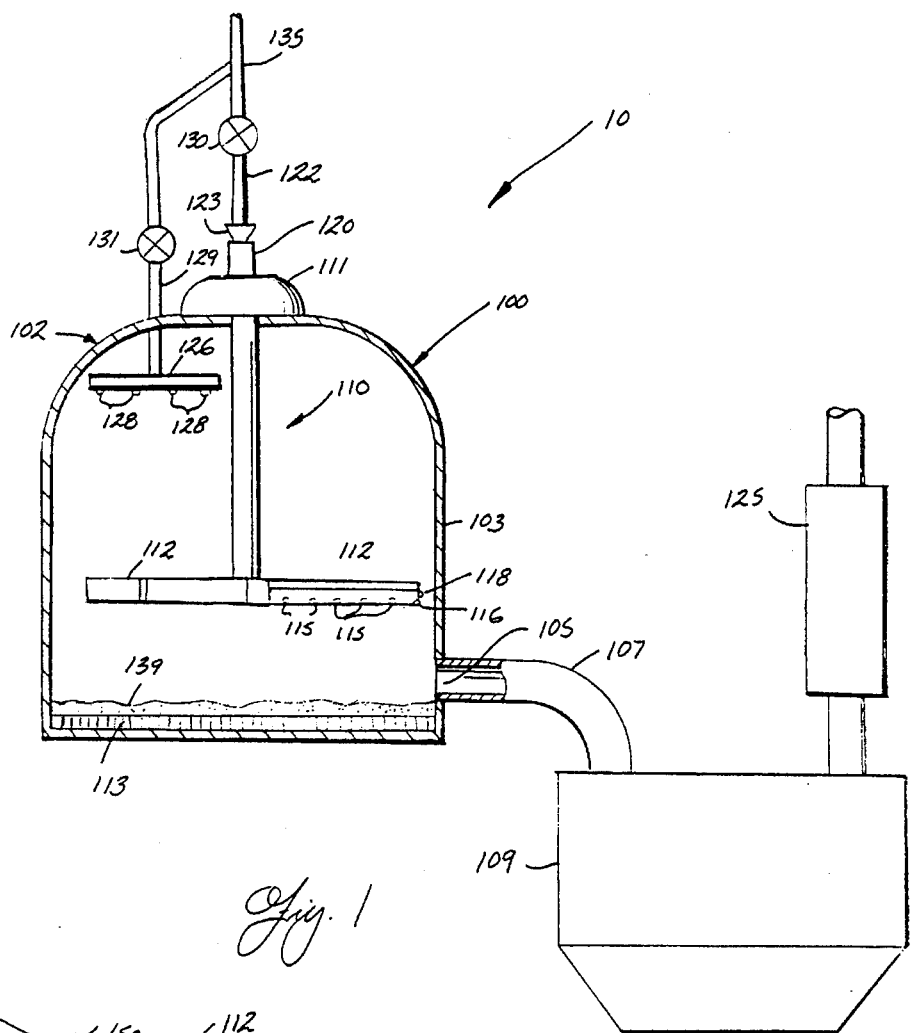
Fig. 1
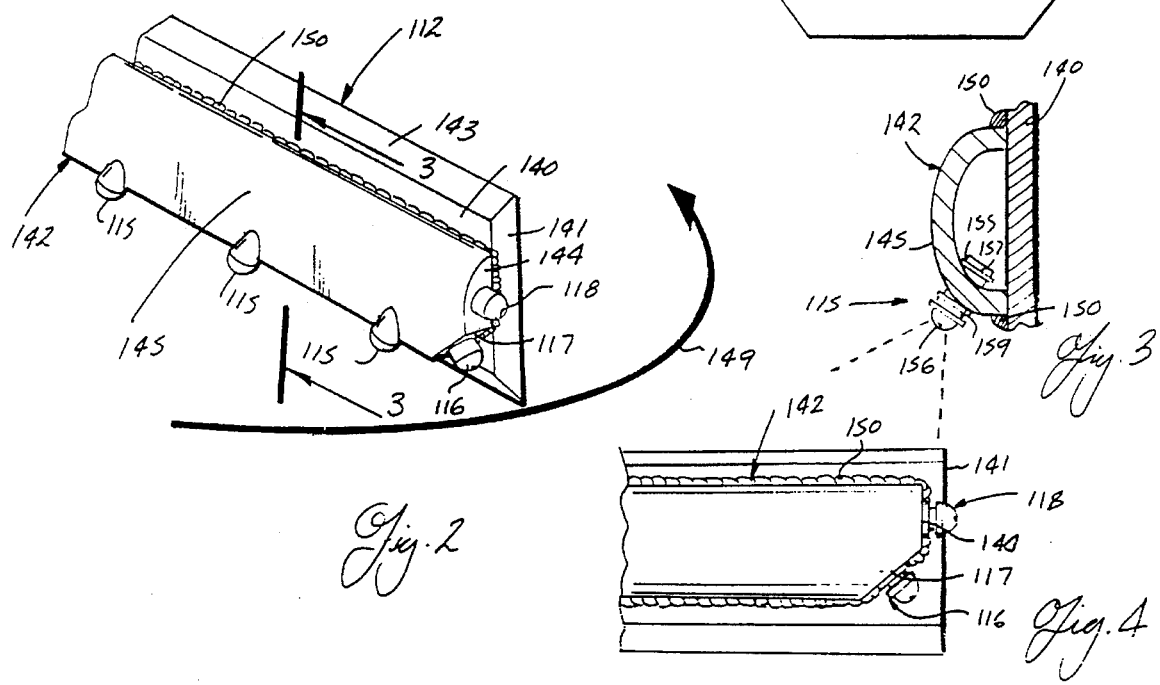
Fig. 2
Fig. 3
Fig. 4

METHOD AND APPARATUS FOR REMOVAL OF RESIDUAL PRODUCT

BACKGROUND OF THE INVENTION

1. Field of the Invention

The invention relates to the removal of residual product from a vessel and more specifically to the removal of residual product from a filter-dryer unit employing a mechanical agitator.

2. Background Art

Filter-dryers are used in the production of a variety of materials, including materials such as used in the formation of pharmaceutical powdered medicines. The basic material from which the powder is formed is typically formulated as a slurry of a predefined mixture of crystals suspended in liquid. A batch of the slurry is commonly loaded into filter-dryer apparatus constructed to separate the crystals from the liquid. The filter-dryer unit may be in the form of a sealed, cylindrically shaped vessel having a filter media in its base to allow the liquid to be drained from the vessel. A side discharge or bottom discharge opening is typically provided to allow the resulting powdered product to be moved out of the vessel to a hopper or the like. A mechanical agitator is rotated within the vessel at a relatively slow rate and is typically moved vertically in the slurry material, as well as being rotated, to facilitate drying. The rate of drying may be increased by the application of heat and removal of vapors, in a conventional manner. The agitator also serves to mechanically move the dried product out of the vessel discharge opening.

A problem is that a residue of the finished product tends to remain in various parts of the vessel. The major volume of residual material, called the heel, is left in the lower wall of the vessel and is not readily removable. The lower wall of the vessel is provided with relatively fragile and expensive filter screens which allow the liquid to pass from the vessel while preventing the loss of solids. The mechanical agitator is a large mechanical device which may be on the order of 10 feet in diameter. To ensure that the screens are not damaged by the agitator, a clearance is required between the agitator and the screens, this clearance may be on the order of 10 millimeters. The residue in that space and elsewhere in the vessel is typically washed away at the end of the batch processing. In certain products, such as pharmaceuticals, the batches cannot be mixed and therefore the residue is essentially lost. The lost residue may be as much as 15% of the batch. The cost of such loss in expensive compounds, such as the pharmaceutical compounds, is indeed very high.

SUMMARY OF THE INVENTION

These and other problems of prior art are solved in accordance with this invention by the use of a gas under pressure which is delivered to the agitator and discharged from the agitator through a plurality of nozzles directed at the heel to remove the heel from the lower part of the vessel including the screens. The residual material is ejected from the vessel through the normal discharge opening and added to batch of dried compound, thereby substantially reducing the percentage of waste in each batch and reducing the cost of the ultimate product.

In accordance with a particular aspect of the invention, the agitator has at least one arm provided with a plurality of nozzles, directed toward the bottom wall of the vessel, through which the gas is discharged under a relatively high pressure to break any crust which may have been formed on the heel as the agitator is rotated. The continued rotary action of the agitator and the gas flow cause the remaining particles of the dried material to be moved through the discharge opening. Standard dust-filter separating equipment is used to recover the materials from the gas stream exiting the discharge nozzle.

In accordance with another aspect of the invention, the agitator is provided with at least one nozzle directed at the side walls of the vessel so that as the agitator is moved vertically and rotated, any residue will be swept from the side wall.

In accordance with another aspect of the invention, at least one nozzle is disposed, preferably in a fixed position, near the upper portion of the vessel and serves to project a gas onto the upper surface of the mechanical agitator, as it rotates, to remove any residue which may have been deposited on the upper surfaces of the arms of the agitator.

In a particular embodiment of the invention, high-pressure, high-velocity gas is supplied through the hollow shaft of the agitator from a fixed entry nozzle via rotary seals and at least one arm of the agitator is equipped with a plurality of nozzles adjacent a lower edge of the arm and preferably on a trailing side of the arm to reduce direct impingement between the product and the openings of the nozzles.

In one embodiment of the invention, the gas used to remove the residue is nitrogen. A low pressure gas may be applied to the nozzles on a continuing basis during the batch process to purge the nozzles and prevent any build up of material in the nozzle which might interfere with the efficient operation of the residue removal process.

BRIEF DESCRIPTION OF THE DRAWING

An embodiment of the invention is described below with reference to the drawing in which:

FIG. 1 is a diagrammatic representation of a filter dryer unit incorporating the principles of the invention;

FIG. 2 is an enlarged perspective view of one of the arms of the agitator;

FIG. 3 is an enlarged cross-sectional view along line 3—3 of FIG. 2;

FIG. 4 is an enlarged breakaway side view of an end portion of the arm of FIG. 2.

DETAILED DESCRIPTION

FIG. 1 is a diagrammatic representation of a filter-dryer 10 incorporating the principles of the invention. The filter-dryer 10 comprises a vessel 100, preferably of a cylindrical shape with a domed upper wall 102 and a vertical side wall 103 extending around the circumference of the cylindrical vessel. A bottom wall for the vessel may be formed by a filter element 113 which allows for the passage of liquid from the vessel while filtering out particles of the material to be recovered. The liquid emerging from the filter is disposed of in a standard fashion. A side discharge opening 105 is provided for the removal of the particle material by a interconnecting tubing 107 to a hopper, or the like, 109, for further handling. The vessel 102 is provided with a mechanical agitator 110 having one or more arms 112.

The agitator 110 is preferably provided with a hollow shaft 120 connected to a supply of nitrogen or another suitable gas by an intake pipe 122. The gas is supplied to the hollow shaft 120 by means of a well known and commercially available rotary seals 123 which provide a sealing connection between the pipe 122 and the hollow shaft 120. The agitator 110 is rotated and moved vertically by a drive unit 111 in a well-known fashion. Drive unit 111 may comprise any suitable, commercially available agitator drive unit. The pipe 122 may comprise a flexible section to accommodate vertical movement of the shaft 120.

At least one of the agitator arms 112 is provided with a plurality of nozzles 115, 116 directed so as to project a stream of gas downwardly. At least one additional nozzle 118 is provided on one of the arms 112 which directs a stream of gas downwardly and outwardly from one of the arms 112. The vessel 100, as represented in the drawing, provided with a domed upper wall 102, vertical wall 103, filter element 113, tubing 107 and hopper 109 is well known in the art. The agitator 110 may be any of number known agitators used for these purposes. In the arrangement according to the invention, the agitator is modified to accommodate the nozzles 115, 116, 118 and to provide a path for the application of a gas to the nozzles.

In a typical operation, the vessel 100 may be partially filled with a slurry up to a predetermined level, such as indicated by the line 130 in the vessel 100. The agitator 110, in a typical prior art system, is movable in the vertical direction and is rotated near an upper level of the slurry, thereby forming a relatively smooth surface on the slurry. The agitator is moved downwardly as the level of the material is moved downwardly due to the discharge both of the liquid through the filter element 113 and dried material through the discharge opening 105. The drying of the material is typically enhanced by the application of heat to the vessel 100 and the removal of vapors, via standard vacuum producing equipment.

As the agitator 110 is moved downwardly and rotated, the material is discharged until it is within a nominal tolerance (e.g., 5 to 10 millimeters) of the top surface of the filter element 113. When the agitator reaches its lowest point, in which its arms are within the allowed tolerance, a layer 139 finished product dry material is formed and typically compacted between the arms 112 of the rotating agitator and the filter element 113. The layer 139 is referred to as the "heel", representing non-removable product in a conventional system. In the system of this invention, a high-pressure, high-velocity gas is supplied via tube 122 and hollow shaft 120 to the nozzles 115, 116 and 118, and preferably discharged from the nozzles as a high pressure, high velocity gas stream, while the agitator 110 continues to rotate. The force of the gas streams breaks up the often times hardened crust of the heel and loosens the compacted material. The loosened material is forced through the side discharge opening 105 by the action of the agitator and by the pressure of the gas released from the nozzles. For products which do not have a hard crust and are more easily removed, lower gas pressures and lower gas velocities may be used to optimize the product removal process.

Particles of the material being discharged through the opening 105 with the gas released from the nozzles will pass through the tubing 107 into the hopper 109. The heavier particles will fall into the hopper. Lighter particles may remain in suspension in the gas and exit the hopper 109 with the gas via a conventional separator/filter 125, connected to hopper 109, by which suspended particles are recovered. If desired, the gas may be recycled in a conventional manner.

Further shown in FIG. 1 is a fixed gas discharge unit 126 provided with a plurality of downwardly directed nozzles 128 and connected to a gas supply via intake pipe 129. The primary purpose of the gas discharge unit 126 is to remove residue which may have collected on the top surface of arms 112 of the agitator 110. To accomplish such removal, the agitator is preferably raised to a level where it is proximate to the discharge unit 126 to allow gas discharge from the nozzles 128 to force any residue from the upper surface of the arms 112.

The intake pipes 122 and 129 are connected to a gas supply pipe 135 via the control valves 130 and 131, respectively. The control valves may be manually operated valves but are preferably automatically operated in relationship to the position of the agitator 110 to supply the gas at the appropriate times.

FIG. 2 is a partial breakaway perspective view of a distal section of an agitator arm 112. FIG. 2 shows a rear wall 140, an end wall 141 and a top wall 143 of the agitator arm 112. A gas delivery pipe 142 is mounted on a lower portion of the rear wall 140 and has an opening (not shown) in its distal end communicating with, and receiving gas under pressure from, the hollow shaft 120. The delivery pipe 142 has a rounded side wall 145 in which are mounted a plurality of nozzles 115, and end wall sections 144 and 117 on which the nozzles 116 and 118, respectively, are mounted. The direction of rotation of agitator arm 112 is indicated by arrow 149.

FIG. 3 is an enlarged cross-sectional view along the line 3—3 of FIG. 2. The delivery pipe 142 is shown in FIG. 3 as having a semi-circularly shaped side wall 145 mounted on the outer surface of side wall 140. The delivery pipe 142 may be attached to side wall 145 by conventional welding techniques, as represented by weld beads 150.

The nozzles 115, 116, 118 and 128 may be of a type known as a blow-off nozzle which are well known in the art and commercially available. FIG. 3 includes an enlarged view of the nozzle 115 of the commercially available blow-off type. Nozzles 116, 118 and 128 may be of the same design and mounted in the same manner as nozzle 115. The nozzle comprises a hollow shaft 155 to allow for the passage of gas from the delivery pipe 142 to the nozzle head 156. The nozzle head 156 is provided with a plurality of apertures (not shown in the drawing) to provide a particular spray pattern. The spray pattern of the blow-off nozzle typically is an elongated, relatively concentrated pattern adapted to "sweep" a surface. This relatively concentrated spray pattern is advantageous in that it facilitates breaking through a hard surface, such as the crust of the heel. The shaft 155 is provided with exterior threads to allow the nozzle to be mounted in an appropriately tapped aperture (not shown) in the side wall 145. The nozzle is preferably provided with a check valve 159 to prevent inflow of any liquids and gases to the delivery pipe 142 in the event that the surrounding vessel pressure is greater than that inside the delivery pipe.

The gas pressure inside the delivery pipe 142 may be on the order of 110 PSI to provide a gas flow of approximately 200 standard cubic feet per minute at a distance of two inches from the nozzle. For certain hard crust heels, a velocity of 10,000 feet per minute at two inches from the nozzle may be required, while most materials require a significantly lower velocity. The hardness is a function of the reaction of the material to a compacting and wiping action of the agitator. To break the crust of the heel, the agitator is typically positioned very close to the surface of the heel and rotated to apply the gas streams to the crust.

The agitator 110 may be provided with two or more arms, as required for the efficient operation of the dryer/filter. Nozzles, such as the nozzles 115, 116, 118 may be provided in each of the arms. However, nozzles on just one of the arms may be sufficient to accomplish the purposes of removing the residue in many applications. In one particular embodiment, in which the length of one arm extending from the hollow shaft 110 is on the order of six feet, four nozzles are distributed along the length of the delivery pipe 142 with a first nozzle being spaced approximately ⅛th of the length of the arm away from the shaft 120 and another nozzle being spaced at a distance of about ⅛th of the length of the arm away from the outer wall 103. The other two nozzles are spaced apart from the first two nozzles and from each other by a distance approximately equal to one-quarter of the length of the arm. The nozzles preferably each have a substantial spray angle, e.g., 120°, to provide an overlapping spray pattern. The overlapping spray patterns preferably provide a moving line coverage of the heel 139 as the area 112 is rotated close to the upper surface of the heel 139, to further facilitate breaking the crust of the heel.

FIG. 4 is an enlarged breakaway side view of an end portion of the arm 112 and the delivery pipe 142, showing the mounting of nozzles 116 and 118 in greater detail. The nozzle 118 is mounted in the end wall section 144 and positioned to direct a stream of gas onto the interior surface of the wall 103 of the vessel 100. The nozzle 116 is mounted in the slanted end wall section 117 and is directed at an angle to the side wall 103 in order to direct a stream of gas to the area where the upper surface of the heel 140 is adjacent to the outer wall 103. Nozzle 116 is directed at an angle, e.g., 45°, to facilitate breaking the crust of the heel 139 in the area immediately adjacent wall 103.

It is to be understood that the above-described arrangement is merely illustrative of the application of the principles of the invention and that other arrangements may be devised by those skilled in the art without departing from the spirit and scope of the invention.

What is claimed is:

1. Filter-dryer apparatus comprising:
   a sealed cylindrically shaped vessel having an upper wall, a bottom wall at least partially formed by a filter element, and a side wall joined to the upper wall and the bottom wall;
   an agitator rotatably mounted in the vessel and comprising an agitator shaft and an agitator arm, the agitator arm having a predetermined direction of rotation and comprising a rear wall facing a direction opposite the direction of rotation and a plurality of spaced part nozzles mounted to the rear wall, each of the plurality of nozzles directed generally toward the bottom wall; and
   a gas supply line connected to the nozzles and supplying a gas under pressure to the nozzles.

2. The apparatus in accordance with claim 1 wherein the nozzles each provide a spray pattern and spray patterns of adjacent nozzles form an overlapping spray pattern.

3. The apparatus in accordance with claim 2 wherein each of the nozzles provides an concentrated spray pattern.

4. The apparatus in accordance with claim 1 wherein the agitator shaft comprises a hollow shaft connected to a gas intake pipe and the agitator arm comprises a gas delivery pipe mounted on the rear wall and wherein the nozzles are mounted to the delivery pipe.

5. The apparatus in accordance with claim 4 wherein the gas delivery pipe comprises an angled end wall section adjacent the side wall and extending at an angle to the side wall and further comprising a nozzle mounted in the end wall section and having a nozzle head directed to at an acute angle to the bottom wall and the side wall.

6. The apparatus in accordance with claim 4 wherein the gas delivery pipe comprises a substantially vertically extending end wall section adjacent the side wall and further comprising a nozzle mounted in the end wall section and having a nozzle head directed substantially perpendicularly to the side wall.

7. The apparatus in accordance with claim 1 and further comprising a fixed gas discharge unit disposed adjacent the upper wall and comprising at least one nozzle having a nozzle head directed downwardly and the apparatus further comprises a drive unit operatively coupled to the agitator to rotate the agitator and to move the agitator vertically to a position wherein the agitator arm is selectively rotated adjacent the nozzle head.

8. The apparatus in accordance with claim 1 wherein the vessel comprises a discharge opening and gas is discharged from the vessel via the discharge opening and the apparatus further comprises particle separator unit connected to the discharge opening and operative to separate particles from gas discharged through the opening.

9. The apparatus in accordance with claim 1 wherein the agitator arm comprises a nozzle connected to the gas supply line and having a nozzle head directed at an acute angle to the bottom wall and to the side wall.

10. The apparatus in accordance with claim 1 wherein the agitator arm comprises a side nozzle connected to the gas supply line and having a nozzle head directed substantially perpendicularly to the side wall and wherein the agitator is movable in the vertical direction while being rotated, whereby gas under pressure is directed onto the side wall while the agitator is moved in the vertical direction while being rotated and material residue on the side wall is removed by the gas.

11. A method for removing residual product from the bottom wall of a vessel of filter-dryer apparatus having a horizontally extending bottom wall and a vertically extending side wall and an agitator arm rotatably mounted therein and a discharge opening in the side wall, the method comprising the steps of:
   rotating the agitator arm in a predetermined direction;
   supplying gas under pressure to the agitator arm and directing streams of gas from a rear wall of the agitator arm facing a direction generally opposite the predetermined direction and at the residual product disposed on the bottom wall;
   rotating the agitator arm at a level adjacent an upper surface of the residual product, thereby forcing particles of the residual product in a state of suspension in the vessel;
   attaching a particle separator unit to the discharge opening and allowing the gas with particles of the residual product in suspension to be discharged through the particle separator unit; and
   recovering particles of the residual product from the gas by the particle separator unit.

12. The method in accordance with claim 11 and further comprising the step of directing a stream of gas at an acute angle to the bottom wall and to the side wall.

13. The method in accordance with claim 12 and further comprising the step of directing a stream of gas at the side wall in a direction substantially perpendicular to the side wall.

* * * * *